US012802125B2

(12) United States Patent
Edwards et al.

(10) Patent No.: US 12,802,125 B2
(45) Date of Patent: Nov. 17, 2026

(54) MEDICAL IMPAIRMENT MODE FOR ACCOUNT

(71) Applicant: Capital One Services, LLC, McLean, VA (US)

(72) Inventors: Joshua Edwards, Carrollton, TX (US); Michael Mossoba, Great Falls, VA (US); Ewelina Wozniak, West Orange, NJ (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 18/508,097

(22) Filed: Nov. 13, 2023

(65) Prior Publication Data

US 2025/0156938 A1 May 15, 2025

(51) Int. Cl.
*G06Q 40/02* (2023.01)

(52) U.S. Cl.
CPC ........... *G06Q 40/02* (2013.01); *G06Q 40/022* (2025.08); *G06Q 40/0221* (2025.08)

(58) Field of Classification Search
CPC ...... G06Q 40/02; G06Q 40/08; G06Q 40/022; G06Q 40/0221
See application file for complete search history.

(56) References Cited

U.S. PATENT DOCUMENTS 11,037,231 B1 6/2021 Barakat et al.
11,068,987 B1 * 7/2021 Kubera .................. G06Q 40/02
11,270,603 B1 3/2022 Bansal et al.
2015/0081495 A1 * 3/2015 Randall .................. G06Q 40/02 705/35
2021/0334813 A1 10/2021 Clausen et al.
2022/0067741 A1 3/2022 Benkreira et al.
2022/0135001 A1 5/2022 Alsina et al.
2023/0386320 A1 * 11/2023 Meijer ................. A61B 5/0017

OTHER PUBLICATIONS

Mauran, Cecily. "So, How Exactly Does Apple's Crash Detection Work? Apple Execs Break it Down." Mashable.com. Oct. 10, 2022 (Year: 2022).*
McLaughlin, Molly. "The Best Free GPS Apps for Your IPhone." PCMag.com. Jan. 20, 2016. (Year: 2016).*

* cited by examiner

*Primary Examiner* — Elda G Milef
(74) *Attorney, Agent, or Firm* — Sterne, Kessler, Goldstein & Fox P.L.L.C.

(57) ABSTRACT

Disclosed herein are system, method, and computer program product embodiments for applying a medical impairment mode to an account. A computer system receives a first data signal comprising real-time location, vital signs, or acceleration data of the primary account holder from a user device. Based on the real-time location, vital signs, or acceleration data, the computer system determines an impairment status for the primary account holder. Using the second transaction history for a non-primary account holder or data records from third-party sources, the computer system confirms the impairment status for the primary account holder and activates management controls for the one or more accounts associated with the primary account holder and the non-primary account holder. The computer system receives a second data signal indicating the primary account holder is no longer impaired and, based on the second data signal, deactivates the management controls for the one or more accounts.

20 Claims, 6 Drawing Sheets

User Device 200

MEDICAL IMPAIRMENT MODE FOR ACCOUNT

BACKGROUND

Existing web portals typically require a username and password to authenticate a user to access his or her account. Some services may further include two-factor authentication as a heightened measure to verify a user's identity and authenticate them to access user-specific information.

BRIEF SUMMARY

Disclosed herein are system, apparatus, device, method and/or computer program product embodiments, and/or combinations and sub-combinations thereof for protecting an account of a primary account holder during a period of medical impairment.

Some embodiments are directed to a computer-implemented method for protecting an account of a primary account holder during a period of medical impairment. For example, the method can include storing, by a cloud server, one or more accounts associated with a primary account holder and a non-primary account holder in a database, wherein the one or more accounts comprise a first transaction history for the primary account holder and a second transaction history for the non-primary account holder. The method can further include receiving, by the cloud server, a data signal comprising real-time location data, vital signs data, or acceleration data of the primary account holder from a user device. The method can further include determining, by the cloud server, an impairment status for the primary account holder based on the real-time location data, vital signs data, or acceleration data of the primary account holder. The method can further include confirming, by the cloud server, the impairment status for the primary account holder based on the second transaction history for the primary account holder or data records from third party sources. The method can further include activating, by the cloud server and based on the confirming, management controls for the one or more accounts associated with the primary account holder and the non-primary account holder. The method can further include receiving, by the cloud server, a second data signal indicating the primary account holder is no longer impaired. Finally, the method can include deactivating, by the cloud server and based on the receiving the second data signal, the management controls for the one or more accounts associated with the primary account holder and the non-primary account holder.

Some embodiments are directed to a system for protecting an account of a primary account holder during a period of medical impairment. For example, the system can include a database for storing one or more accounts associated with a primary account holder and a non-primary account holder, wherein the one or more accounts comprise a first transaction history for the primary account holder and a second transaction history for the non-primary account holder. The system can further include a memory for storing operations and one or more processors configured to execute operations that include receiving a first data signal comprising real-time location data, vital signs data, or acceleration data of the primary account holder from a user device. The operations can further include determining an impairment status for the primary account holder based on the real-time location data, vital signs data, or acceleration data of the primary account holder. The operations can further include transmitting an alert to the primary account holder requesting confirmation of the impairment status from the primary account holder. The operations can further include receiving a reply to the alert. The operations can further include confirming the impairment status for the primary account holder based on the reply to the alert or data records from third-party sources. The operations can further include activating, based on the confirming, management controls for the one or more accounts associated with the primary account holder and the non-primary account holder. The operations can further include receiving a second data signal indicating the primary account holder is no longer impaired. Finally, the operations can further include deactivating, based on the receiving the second data signal, the management controls for the one or more accounts associated with the primary account holder and the non-primary account holder.

Some embodiments are directed to a non-transitory computer readable medium that includes instructions for causing a processor to perform operations. For example, the operations can include storing one or more accounts associated with a primary account holder and a non-primary account holder in a database, wherein the one or more accounts comprise a first transaction history for the primary account holder and a second transaction history for the non-primary account holder. The operations can further include receiving a first data signal comprising real-time location data or vital signs data of the primary account holder from a user device. The operations can further include determining an impairment status for the primary account holder based on the real-time location data or vital signs data of the primary account holder. The operations can further include confirming the impairment status for the primary account holder based on the second transaction history for the non-primary account holder or data records from third-party sources. The operations can further include activating, based on the confirming, management controls for the one or more accounts associated with the primary account holder and the non-primary account holder. The operations can further include receiving a second data signal indicating the primary account holder is no longer impaired. Finally, the operations can include deactivating, based on the receiving the second data signal, the management controls for the one or more accounts associated with the primary account holder and the non-primary account holder.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for applying a medical impairment mode to an account, according to some aspects of the disclosure.

While existing web portals leverage a username, password, and/or two-factor authentication measures, they do not receive information that could be used to determine a user's current physical and/or mental state. For example, a customer may experience one or more events, such as a major surgery, a fall, or a car accident, that may hinder their ability to complete convention web portal authentication processes. And even if they are able to complete portal authentication processes, existing systems lack the capability to determine whether a user is physically capable or mentally fit to interact with portal features granted to authenticated users.

In some embodiments, this disclosure provides unique solutions to the above technical problems of current web technologies. For example, the disclosed system provides several technical implementations which include, for example, aggregating real-time location data, vital signs data, and/or acceleration data of a primary user for an impairment model; identifying relevant data, apart from data directly associated with a primary user, to improve the model determination regarding impairment (e.g., identifying a relevant second user, such as a spouse of the primary user, and querying for the second user's transaction history); and using the model output to activate management controls for one or more accounts associated with the primary account holder and the non-primary account holder.

Figure 1:
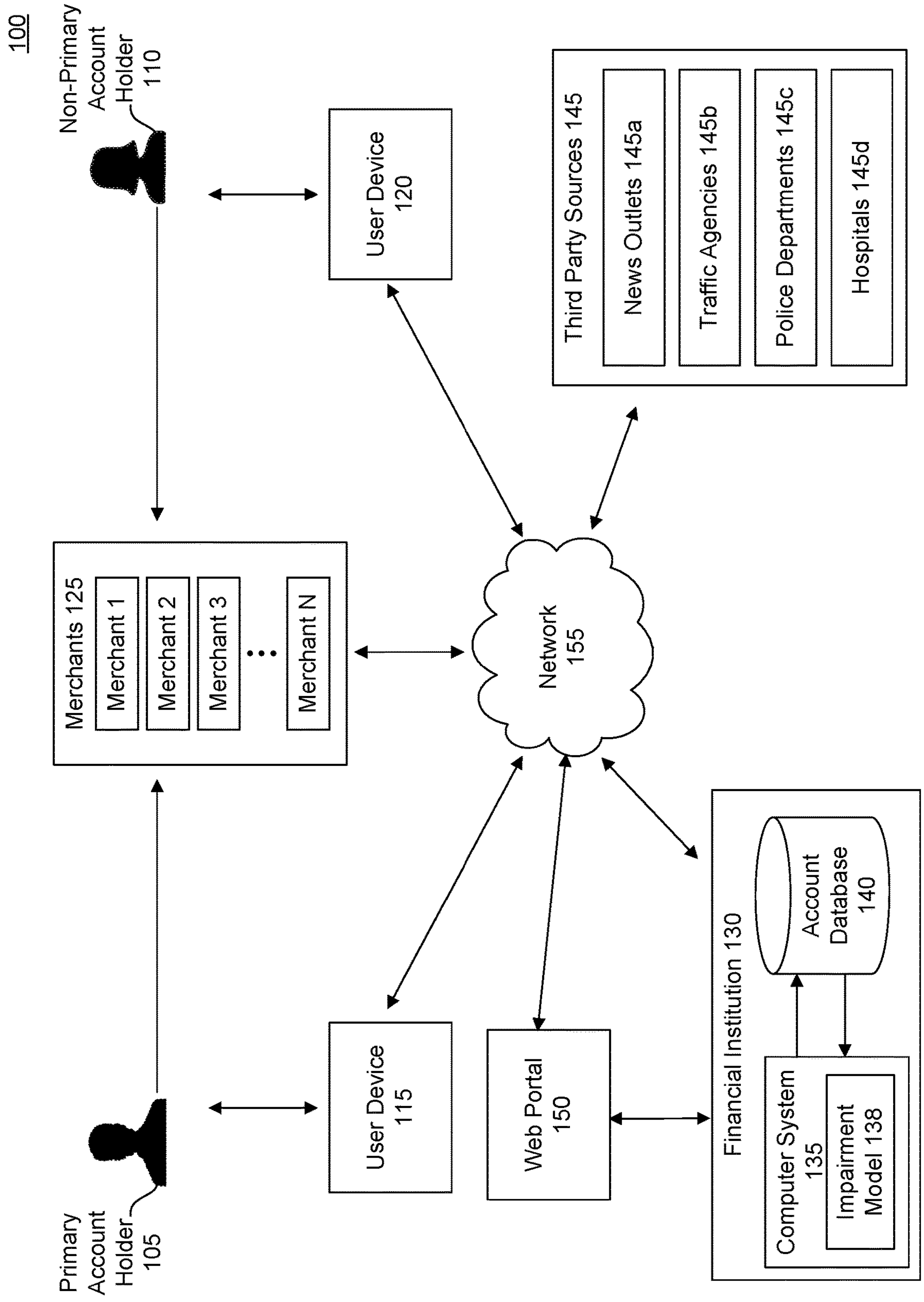
FIG. 1 illustrates a block diagram of an exemplary environment for protecting an account during a period of medical impairment, in accordance with aspects of the disclosure.

FIG. 1 illustrates a block diagram of an exemplary environment 100 for protecting an account during a period of medical impairment, in accordance with some aspects of the disclosure. As shown in FIG. 1, the environment 100 may include a primary account holder 105, a non-primary account holder 110, user devices 115 and 120, merchants 125, a financial institution 130, a computer system 135, an account database 140, third-party sources 145, a web portal 150, and a network 155.

The primary account holder 105 may be a client who owns one or more accounts maintained by an organization, such as an employer, a college or university, or a financial institution. The primary account holder 105 may establish the one or more accounts by submitting an application to the organization and is liable for ensuring that the one or more accounts remain in good standing. The primary account holder 105 may have the authority to grant one or more other persons access or use of the one or more accounts. In the embodiment shown in FIG. 1, the one or more accounts may include, but are not limited to, savings accounts, checking accounts, credit card accounts, loan accounts, investment accounts, and other commercial accounts managed by the organization (e.g., financial institution 130). Furthermore, in the embodiment shown in FIG. 1, the primary account holder 105 may remotely access each account of the one or more accounts via a web portal provided by the organization that maintains the respective account.

The non-primary account holder 110 may be a secondary user (e.g., a spouse, child, parent, friend, etc.) that is authorized by the primary account holder 105 to access and use the one or more accounts. Typically, the non-primary account holder 110 is not liable for making timely payments or repaying debts associated with the one or more accounts. Furthermore, the non-primary account holder 110 may be issued separate credentials (e.g., a different card and card number) for accessing and/or using the one or more accounts. In some aspects, the non-primary account holder 110 may not be permitted to access the one or more accounts via a web portal provided by the organization unless an event occurs.

User devices 115 and 120 may include devices that are capable of executing various software applications and reporting real-time status data (e.g., real-time location data, vital signs data, or acceleration data) of the primary account holder 105 and non-primary account holder 110 to computer system 135. For example, user devices 115 and 120 may be cellular telephones, smartphones, personal digital assistants (PDAs), tablet computers, laptop computers, Internet-of-Things (IoT) devices, on-board computers in vehicles, or the like.

One or more merchants 125 may include physical stores and online websites that sell goods and services. Merchants 125 may utilize point-of-sale (POS) devices, such as card readers to process purchase transactions. Card readers may include a chip reader, a magnetic strip reader, near field communication (NFC) receiver, a radio frequency (RF) antenna, or the like.

The primary account holder 105 and/or non-primary account holder 110 may purchase product(s) or service(s) at merchants 125 using a debit card or credit card corresponding to the one or more accounts associated with the primary account holder 105 and non-primary account holder 110. In some aspects, during a purchase transaction, the card reader can obtain account information from the debit card or credit card and send an authorization request to the issuer bank (e.g., financial institution 130). An authorization request may include a merchant's name and location, the transaction amount, and the transaction date. The merchant may also transmit additional transaction details to the issuer bank such as the name for each product or service purchased, the stock-keeping unit (SKU) code to identify products or services, the category designation for each product or service, and/or the sales price for each product or service. The issuer bank may respond to an authorization request by sending a message to the merchant indicating an approval or denial of the transaction based on the status of the one or more accounts associated with the primary account holder 105 and the non-primary account holder 110. If the merchant obtains an approval message from the issuer bank, the merchant may complete the transaction. Otherwise, if the merchant receives a denial message, the merchant may cancel the transaction.

Financial institution 130 may be a commercial bank, a trust company, an insurance company, a brokerage firm, an investment bank, or the like. Financial institution 130 may further manage the one or more accounts associated with the primary account holder 105 and the non-primary account holder 110. In some aspects, financial institution 130 may comprise a computer system 135, impairment model 138, and an account database 140.

Computer system 135 may be a client or server device (e.g., host server, cloud server, web server, application server, etc.). Computer system 135 may include one or more central processing units, a main memory, one or secondary storage devices, a network interface, and an operating system.

Impairment model 138 may comprise a predefined set of rules to determine an impairment status of the primary account holder 105 indicating whether the primary account holder 105 has experienced an impairment event (e.g., fall, automobile accident, or medical emergency) and/or is impaired using real-time status data reported by user devices 115 and 120. For example, impairment statuses may indicate that the primary account holder 105 is "likely impaired due to an impairment event," "impaired due to an impairment event," or "not impaired." In some embodiments, the impairment model 138 may include one or more exceptions to the predefined set of rules that can be derived using data in account database 140 or learned based on trends that can be identified in historical records of real-time status data reported by user devices 115 and 120. Furthermore, in some embodiments, the impairment model 138 may additionally include one or more rules, routines, or algorithm for determining when to deactivate management controls for the one or more accounts. In the embodiment shown in FIG. 1, the impairment model 138 may be implemented using computer system 135.

Account database 140 may be a centralized database, a distributed database, a relational database, a cloud database, or any other type of database. Account database 140 may store a first profile for a primary account holder 105, a second profile for a non-primary account holder 110, a first transaction history for a primary account holder 105, and a second transaction history for the non-primary account holder 110. The first profile for the primary account holder 105 and the second profile for the non-primary account holder 110 may each include data from the original application that the primary account holder 105 submitted to establish an account of the one or more accounts such as a name, home address, phone number(s), occupation, employment location, one or more email addresses, and demographic data. The first profile for the primary account holder 105 and the second profile for the non-profile account holder 110 may each also include a username and password required for logging into a respective website or web portal for the one or more accounts. In some embodiments, the first profile for the primary account holder 105 and the second profile for the non-primary account holder 110 may each also include historical records of real-time status data reported by a corresponding user device (e.g., user device 115 or 120). In some embodiments, the first profile for the primary account holder 105 and the second profile for the non-primary account holder 110 may each also include one or more patterns determined based on a subset of transactions in the first transaction history for the primary account holder 105 and the second transaction history for the non-primary account holder 110. In some embodiments, the first profile for the primary account holder 105 may also include the name, address, phone number, and email address for an emergency contact for the primary account holder 105. Furthermore, in some embodiments, the account database 140 may additionally store a first login history for the primary account holder 105 and a second login history for the non-primary account holder 110 for auditing and security purposes. The first login history may store the dates, times, and locations of attempts to log into the web portal for the respective account using the username and password belonging to the primary account holder 105. The second login history may likewise store the dates, times, and locations of attempts to log into the web portal for the respective account using the username and password belonging to the non-primary account holder 110.

One or more third party sources 145 may be external resources that are accessed by the impairment model 138 to determine and/or confirm impairment status of primary account holder 105 determined by impairment model 138. Third party sources 145 may include, but are not limited to, data records from local news outlets 145*a*, local traffic agencies 145*b*, local police departments 145*c*, and hospitals 145*d*.

Web portal 150 may comprise a website acting as a single point of access to the one or more accounts managed by financial institution 130. Web portal 150 may provide access to the one or more accounts based, in part, on the impairment status of the primary user 105 determined by impairment model 138. In other embodiments, web portal 150 may a third-party website that provides access to systems and/or data not managed by financial institution 130. In the embodiment shown in FIG. 1, web portal 150 may query the impairment model 138 for an impairment status of an individual and use the impairment status to determine whether to grant the individual remote access to the one or more accounts.

Network 155 may include one or more wired or wireless networks. For example, the network 155 may include a cellular network (e.g., a long-term evolution (LTE) network, a code division multiple access (CDMA) network, a 3G network, a 4G network, a 5G network, another type of next generation network, etc.). The network 155 may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
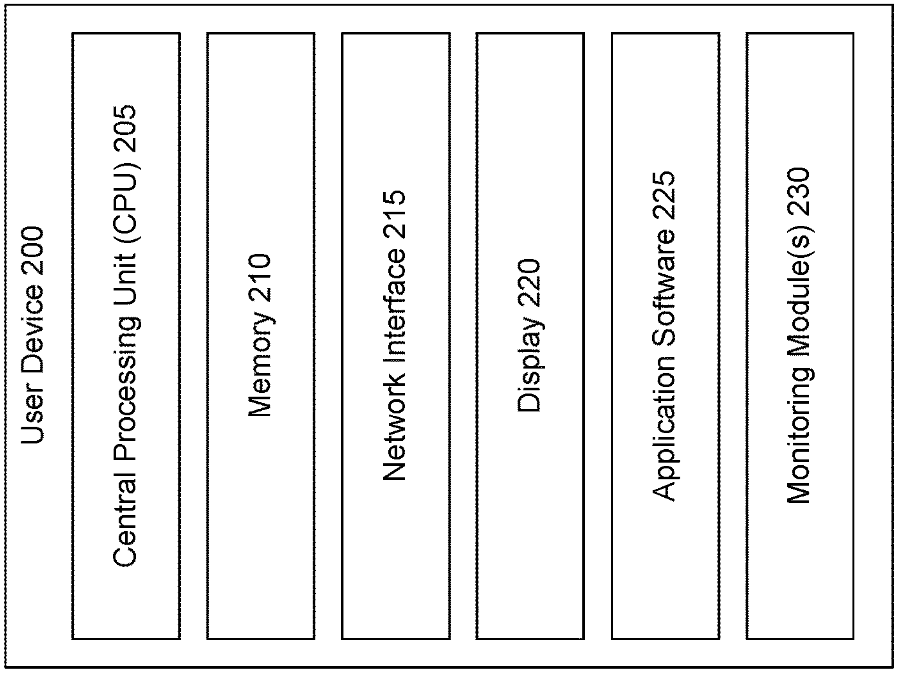
FIG. 2 illustrates a block diagram of an exemplary user device, in accordance with aspects of the disclosure.

FIG. 2 illustrates a block diagram of an exemplary user device 200, in accordance with aspects of the disclosure. For example, user device 200 may represent one or both of user device 115 and/or 120. In some embodiments, user device 200 may include a central processing unit (CPU) 205, a memory 210, a network interface 215, and a display 220. In some embodiments, user device 200 may also include various modules, which can be implemented as hardware, software, or a combination of hardware and software, such as application software 225 and one or more monitoring modules 230.

Application software 225 may include financial software, health care software, multimedia software, social networking software, or any other software. For example, application software 225 can be a financial software application that enables a primary account holder 105 to access and review information regarding the one or more accounts managed by financial institution 130.

One or more monitoring modules 230 may include any device capable of obtaining and reporting real-time status data to computer system 135.

In some embodiments, the one or more monitoring modules 230 may include a geolocation monitoring device that generates real-time location data comprising a pair of longitude and latitude numbers describing the current location of primary account holder 105. Real-time location data can be useful in detecting if the primary account holder 105 experienced an event causing impairment. For example, the impairment model 138 may determine that the primary account holder 105 is likely impaired when the location data reported by the geolocation monitoring device matches the location data for the hospital or doctor's office for a period longer than a predetermined threshold.

In at least one embodiment, a geolocation monitoring device may be a global positioning system (GPS) receiver. A GPS receiver may calculate the location of a user device 115 based on location and timing data received from multiple satellites in the Global Navigation Satellite System network. Alternatively, or in addition to GPS, the geolocation monitoring device may generate location data using other technologies. For example, the geolocation monitoring device may rely on Cell-ID to determine the location of a user device 115. In this case, the geolocation monitoring device may identify the base station in the cellular network that is connected to the user device and report the center of the geographical area serviced by the identified base station as the location of the user device 115. The geolocation monitoring device may also determine the location of the user device 115 with respect to one or more network access points. In this case, the geolocation monitoring device may identify the location of a nearby network access point and use signal strength to calculate the distance between the identified network access point and the user device.

In some embodiments, the one or more monitoring modules 230 may also include one or more vital sign monitoring devices that generate real-time vital signs data for the primary account holder 105. Vital signs may be objective measurements of the body's basic physiological functions and may include temperature, pulse rate, blood pressure, respiratory rate, or the like. Real-time vital signs can be useful in detecting if the primary account holder 105 is experiencing an event causing impairment. For example, impairment model 138 may determine that the primary account holder 105 is experiencing a medical emergency or distress and likely impaired when one of one or more vital signs monitoring devices detects an abnormally fast heart rate. In at least one embodiment, the one or more vital sign monitoring devices may include, but are not limited to, a thermometer for measuring body temperature, an electrocardiogram (ECG) or photoplethysmography (PPG) sensor for measuring pulse rate, a pulse oximeter for measuring respiratory rate, and a blood pressure monitor for measuring blood pressure.

In some embodiments, the one or more monitoring modules 230 may include an accelerometer. Acceleration data can also be useful in detecting if the primary account holder 105 experienced an event causing impairment. For example, the accelerometer in user device 115 may report a sudden increase in acceleration to computer system 135. In this case, impairment model 138 may determine that the primary account holder 105 experienced a fall and is likely impaired. In another example, impairment model 138 may determine that the primary account holder 105 was involved in an automobile accident and is likely impaired when the accelerometer in user device 115 reports a sudden decrease in acceleration.

Figure 3:
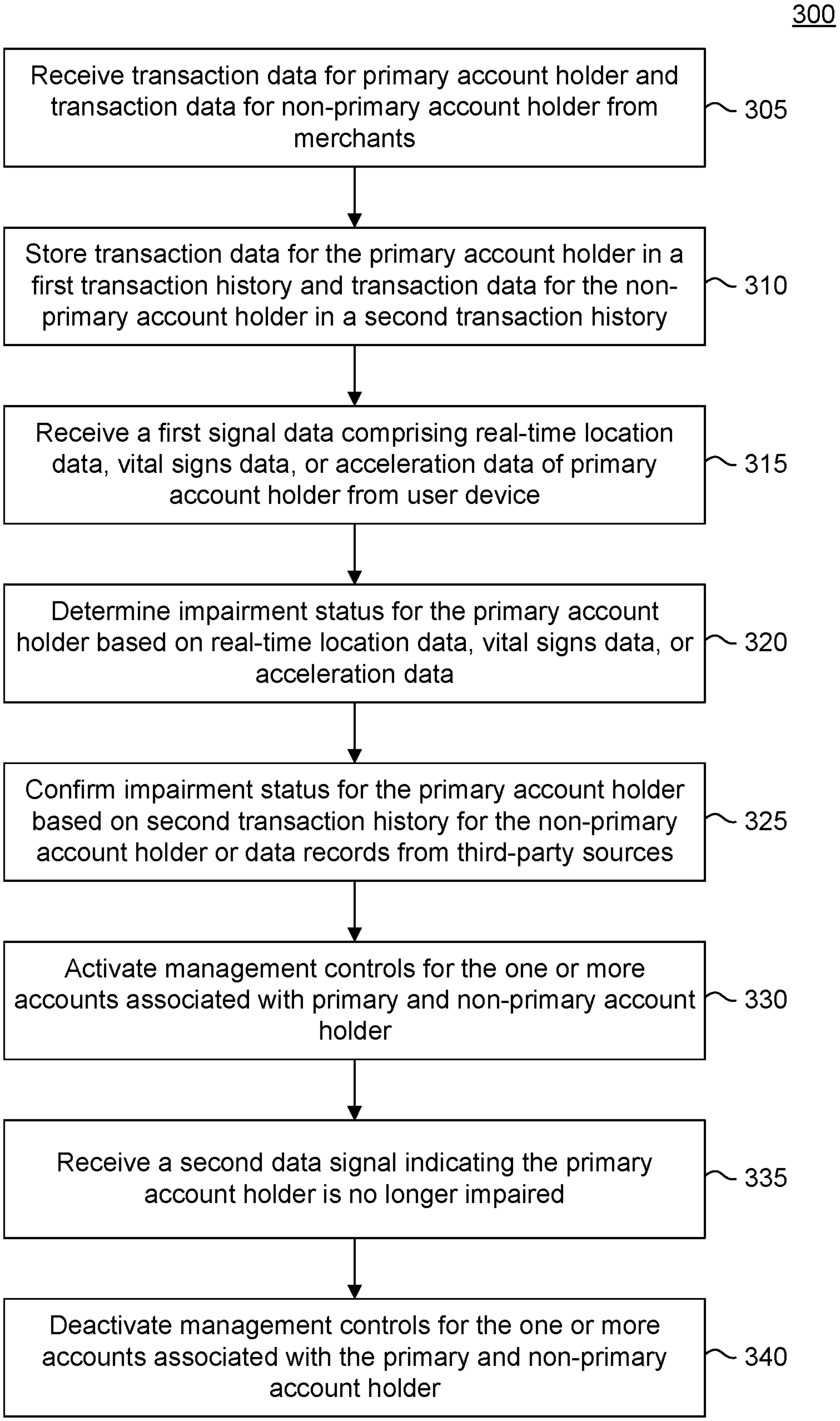
FIG. 3 illustrates a flow chart of an example method for protecting an account during a period of medical impairment, in accordance with aspects of the disclosure.
Figure 4:
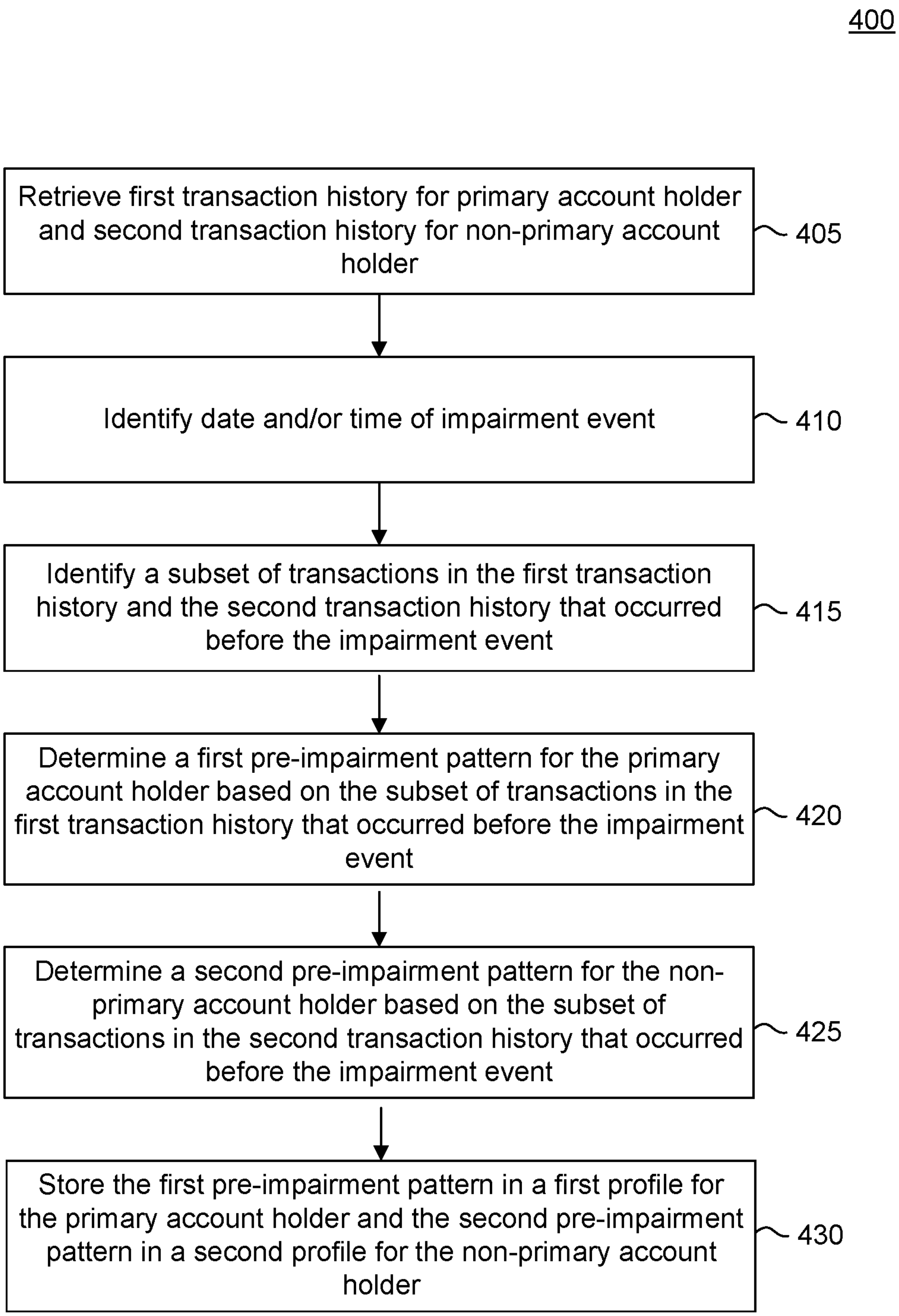
FIG. 4 illustrates a flow chart of an example method for determining one or more first pre-impairment patterns for a primary account holder and one or more second pre-impairment patterns for a non-primary account holder, in accordance with aspects of the disclosure.
Figure 5:
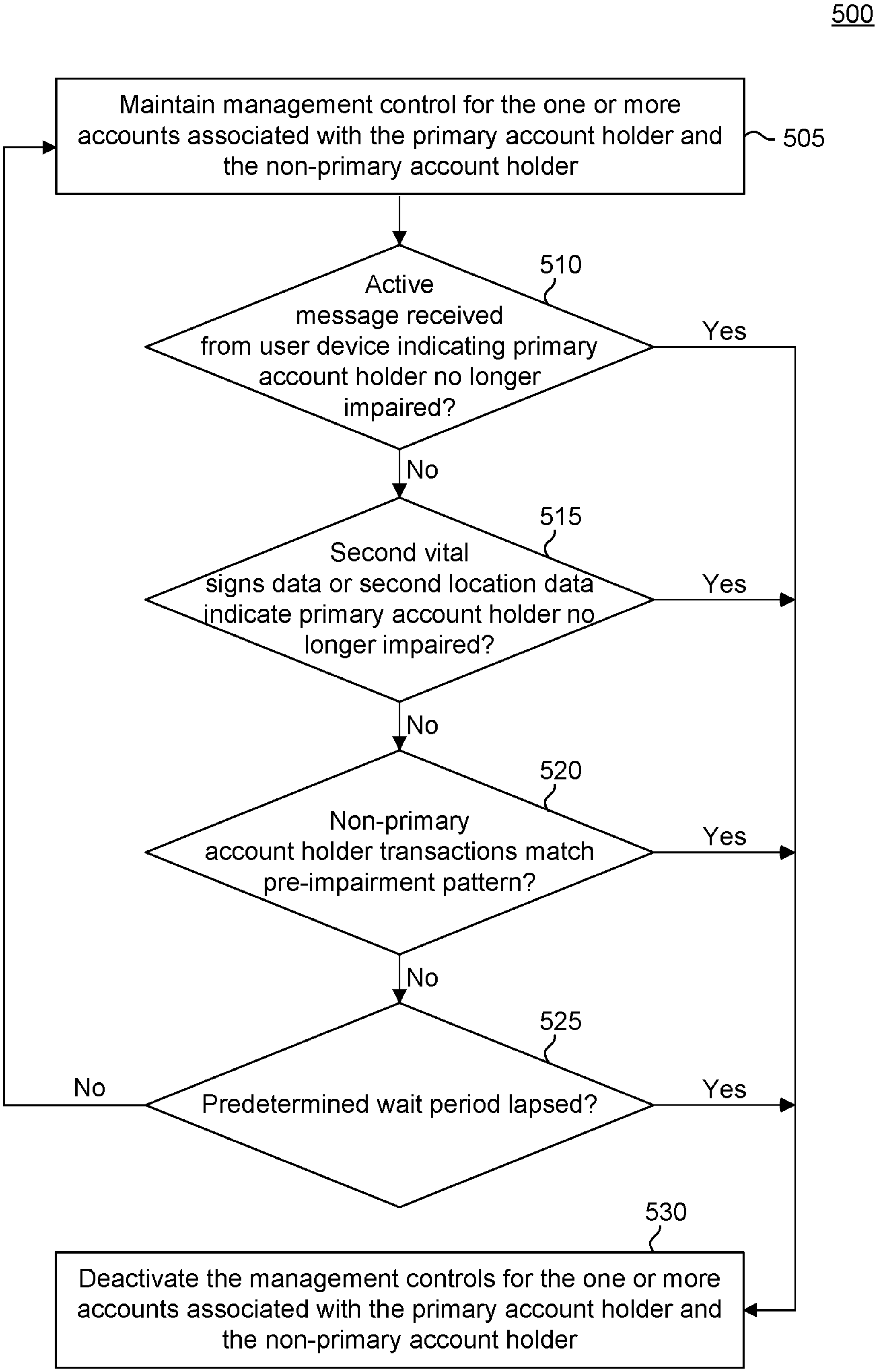
FIG. 5 illustrates a flow chart of an example method for deactivating management controls from an account, in accordance with aspects of the disclosure.

FIGS. 3-5 further display key aspects of a method for applying a medical impairment mode to an account. An example scenario is provided to illustrate better the inventive concept disclosed herein. In this scenario, the primary account holder 105 may be seriously injured in a collision with another vehicle during his morning commute to work and transported to a nearby hospital. Shortly after the accident, police officers may arrive to gather details about the accident (e.g., names of the parties, description of the vehicles, and date and time of the accident). The police officers may later complete their investigation and file an incident report with the local police department. Meanwhile, in this scenario, the primary account holder 105 may remain in the hospital for an additional week after undergoing surgery to treat his injuries. During this period, the primary account holder 105 maybe impaired and unable to manage several accounts, which may include a credit card account at financial institution 130 that the primary account holder 105 and his spouse (a non-primary account holder 110) use to pay for monthly expenses and purchase various goods and services.

FIG. 3 illustrates a flow chart of an example method 300 for protecting an account during a period of medical impairment, in accordance with aspects of the disclosure. At 305, the computer system 135 may receive transaction data for a primary account holder 105 and transaction data for a non-primary account holder 110 from merchants 125. During purchase transactions that involve a credit card or a debit card for a checking account, the computer system 135 may receive transaction data from merchants 125 when the merchant submits an authentication request to the financial institution 130. The authentication request may include transaction details such as the merchant's name and location, the transaction amount, and the transaction date. Merchants 125 may also transmit additional transaction details to the financial institution 130, including the name for each product or service purchased, the stock-keeping unit (SKU) code to identify products or services, the category designation for each product or service, and/or the sales price for each product or service.

At 310, the computer system 135 may store transaction data for the primary account holder 105 in a first transaction history and transaction data for the non-primary account holder 110 in a second transaction history in account database 140. In some embodiments, transaction data in the first transaction history and transaction data in the second transaction history may be organized by transaction date. For example, as the primary account holder 105 completes purchase transactions at merchants 125, each new purchase transaction is appended at the end of the first transaction history. Similarly, as the non-primary account holder 110 completes purchase transactions at merchants 125, each new purchase transaction is appended at the end of the second transaction history.

At 315, impairment model 138 executing on computer system 135 may receive a first signal data comprising real-time location data, vital signs data, or acceleration data of the primary account holder 105 from user device 115. In one embodiment, the user device 115 may transmit real-time location data, vital signs data, or acceleration data to impairment model 138 at predetermined time intervals (e.g., once thirty or sixty seconds). In another embodiment, the user device 115 may continuously transmit real-time location data, vital signs data, or acceleration data of the primary account holder 105 to impairment model 138. In yet another embodiment, the impairment model 138 may transmit a request to user device 115 for the real-time location data, vital signs data, or acceleration data.

At 320, the impairment model 138 may determine an impairment status for the primary account holder 105 based on the real-time location data, vital signs data, or acceleration data. As mentioned earlier, the impairment status determined by impairment model 138 may indicate whether the primary account holder 105 experienced an impairment event (e.g., a fall, automobile accident, or medical emergency) and/or is impaired. In some embodiments, operation 320 may also include the impairment model 138 generating and storing a record for the impairment event in an event log for the primary account holder 105. A record for each impairment event may include a date, a timestamp, a predicted description of the impairment event (e.g., car accident, fall, health emergency), and one or more of real-time location data, vital signs data, and acceleration data. Operation 320 may also include the impairment model 138 transmitting an alert to an emergency contact for the primary account holder 105 based on the determined impairment status. The alert may include a notification from a mobile application, an email message, a text message, or phone call. In one embodiment, the alert may simply inform an emergency contact that the primary account holder 105 experienced an impairment event. In another embodiment, the alert may also inform the emergency contact that the non-primary account holder 110 has access to the one or more accounts associated with the primary account holder 105 and the non-primary account holder 110. In yet another embodiment, the alert may also inform the emergency contact that they have been elevated to manager status for the one or more accounts associated with the primary account holder 105 and the non-primary account holder 110.

In some aspects, at operation 320, the impairment model 138 may determine the impairment status for the primary account holder 105 based on the real-time location data obtained from user device 115. Upon receiving the real-time location data from user device 115, impairment model 138 may identify businesses that are within a predetermined distance (e.g., a 0.5-mile radius) from the primary account holder 105. Impairment model 138 may determine which, if any, of the identified businesses are medical facilities. Medical facilities may include, but are not limited to, hospitals, surgical centers, urgent care centers, clinics, and doctor offices. If one or more medical facilities are within the predetermined distance from the primary account holder 105, impairment model 138 may compare the real-time location data obtain from user device 115 to location data of the identified medical facilities. Location data of identified medical facilities may include GPS coordinates or a series of GPS coordinates defining a virtual boundary. When the real-time location data from user device 115 matches the location data for one of the medical facilities, impairment model 138 may select that medical facility as the current location of the primary account holder 105. If the location of the primary account holder 105 has not changed for a time period exceeding a predefined threshold (e.g., four hours), impairment model 138 may determine that the primary account holder 105 is likely impaired. Furthermore, in some embodiments, the impairment model 138 may additionally check for potential exceptions. For example, the impairment model 138 may determine if the location data for the identified medical facility matches the employment location for the primary account holder 105. In such scenarios, the impairment model 138 may conclude that the primary account holder 105 is not impaired.

In some aspects, at operation 320, the impairment model 138 may determine the impairment status for the primary account holder 105 based on real-time vital signs data obtained from user device 115. Vital signs data may include heart rate, blood pressure, respiratory rate, or temperature. Upon receiving real-time vital signs data from user device 115, impairment model 138 may compare the data to one or more vital sign abnormality thresholds. In some embodiments, vital sign abnormality thresholds may include, but are not limited to, a heart rate less than 60 beats per minute (BPM) or greater than 100 BPM, systolic blood pressure higher than 180 mmHg, diastolic blood pressure higher than 120 mmHg, oxygen saturation by pulse oximetry less than 90 percent, and a temperature higher than 39 degrees Celsius. In other embodiments, the impairment model 138 may alternatively define a vital sign abnormality threshold for each vital sign based on trends (e.g., monthly, quarterly, or lifetime averages) identified in historical records of real-time vital signs data reported by user device 115. Impairment model 138 may further determine that the primary account holder 105 is experiencing a medical emergency and likely impaired when the real-time vital signs data from user device 115 violates any vital sign abnormality threshold.

In some aspects, at operation 320, the impairment model 138 may determine the impairment status for the primary account holder 105 based on real-time acceleration data obtained from user device 115. Real-time acceleration data may indicate a sudden increase or decrease in acceleration. If the real-time acceleration data from user device 115 reflects a sudden increase in acceleration, impairment model 138 may predict that the primary account holder 105 may have fallen. However, if the real-time acceleration data from user device 115 reflects a sudden decrease in acceleration, impairment model 138 may predict that the primary account holder 105 may have been involved in a vehicle collision.

For example, in the above scenario, user device 115 may transmit real-time acceleration data indicating a sudden decrease in acceleration to impairment model 138 of computer system 135 immediately after the collision. Upon receiving the real-time acceleration data from user device 115, impairment model 138 may determine that the primary account holder 105 was involved in an automobile collision. Impairment model 138 may also generate a record for the impairment event and store the record in an event log for the primary account holder 105. The record for the impairment event may include a date, timestamp, real-time location data, acceleration data, and a predicted description of the event (in this case, "automobile accident").

At 325, the impairment model 138 may improve the model determination by querying a second transaction history for a non-primary account holder 110 or data records from third-party sources. For example, the impairment model 138 may update an initial model determination of "likely impaired due to an impairment event" to "impaired due to an impairment event" based on the second transaction history for the non-primary account holder 110 or data records from third-party sources. Operation 325 may also include the impairment model 138 updating the previously generated record for the impairment event to indicate that the impairment status of the primary account holder 105 has been confirmed.

In some aspects, at operation 325, the impairment model 138 may confirm the impairment status of the primary account holder 105 based on the transaction activity of the non-primary account holder 110. As mentioned earlier, a transaction history for an account holder may include details for each transaction completed by the account holder, including the merchant's name, location, transaction amount, and transaction date. Impairment model 138 may identify one or more transactions in the second transaction history for the non-primary account holder 110 that occurred after detecting the impairment event. For each identified transaction, the impairment model 138 may further compare the merchant's location to the location data for a medical facility previously identified as the current location of the primary account holder 105. If the merchant's site is within a predetermined distance (e.g., a 0.5-mile radius) of the identified medical facility, the impairment model 138 may confirm that the primary account holder 105 is impaired. For example, in the above scenario, the non-primary account holder 110 may purchase meals and beverages at a hospital café multiple times using the credit card financial institution 130 while the primary account holder 105 is in the hospital. Based on these transactions, the impairment model 138 may confirm that the primary account holder 105 is impaired because the transactions occurred after the impairment event and the site of the hospital café falls within a 0.5-mile radius of the hospital.

In some aspects, at operation 325, the impairment model 138 may confirm the impairment status of the primary account holder 105 using data records from third-party sources 145. After determining that the primary account holder 105 experienced an impairment event, the impairment model 138 may search local news outlets 145*a*, traffic agencies 145*b*, police departments 145*c*, and traffic agencies 145*d*. Search criteria may include data obtained from the record of the impairment event and the first profile for the primary account holder 105, such as the name of the primary account holder 105, the time, date, and location of the detected event, or the predicted description of the event. Impairment model 138 may confirm the impairment status of the primary account holder 105 when it can identify at least one matching data record from third-party sources 145. For example, in the above scenario, the impairment model 138 may search a database or website of the local police department 145*c* to obtain the incident report filed by the police officers that investigated the automobile accident. Based on the incident report, the impairment model 138 may confirm that the primary account holder 105 is impaired.

Additionally, in some embodiments, upon detecting an impairment event, impairment model 138 may optionally transmit an alert to user device 115 requesting that the primary account holder 105 confirm impairment status of the primary account holder 105. This alert may be an email message, text message, or notification in a mobile application and may include one or more graphical user elements (e.g., buttons, toggles, or links). The primary account holder 105 may interact with the one or more graphical user elements in the alert to confirm that the detected impairment event occurred. Impairment model 138 may treat the response from user device 115 as confirmation of the impairment status of the primary account holder 105.

At 330, the impairment model 138 may activate at least one management control for the one or more accounts associated with the primary account holder 105 and the non-primary account holder 110 based on the impairment status of the primary account holder 105 determined by impairment model 138. Management controls may include grace period extensions, credit limit increases, anti-fraud restrictions, elevation of an emergency contact for the primary account holder 105 to manager status of the one or more accounts associated with the primary account holder 105 and the non-primary account holder 110, and access restrictions on web portal 150. Anti-fraud restrictions may include enforcing a daily spending limit or blocking transactions that do not match either the first pre-impairment transaction patterns of the primary account holder 105 and the non-primary account holder 110. For example, in the above scenario, computer system 135 may apply a daily spending limit on the credit card account at financial institution 130 after verifying that the primary account holder 105 is impaired. Access restrictions on web portal 150 may include disabling remote access to the one or more accounts associated with the primary account holder 105 while the primary account holder 105 is impaired. For example, web portal 150 may query the impairment model 138 for the impairment status of the primary account holder 105 after receiving an indication of a login attempt using the username and password belonging to the primary account holder 105. If the impairment model 138 returns an impairment status indicates that the primary account holder 105 is impaired, the web portal may block access to the one or more accounts and optionally display a message to the user that online access to the one or more accounts has been restricted.

At 335, the impairment model 138 may receive a second data signal from user device 115 indicating that the primary account holder 105 is no longer impaired. In one embodiment, a second data signal that indicates the primary account holder 105 is not impaired may include a second location data or vital sign data of the primary account holder 105 or an active message indicating that the primary account holder 105 is no longer impaired from user device 115.

At 340, the impairment model 138 may deactivate the management controls for the one or more accounts associated with the primary account holder 105 based on the received second data signal. For example, in the above scenario, impairment model 138 may receive a second location data from user device 115 when the primary account holder 105 leaves the hospital after his one-week stay. Impairment model 138 may determine that the primary account holder 105 is no longer impaired when the second location from user device 115 falls outside a 0.5-mile radius of the hospital. Upon determining that the primary account holder 105 is not impaired, the impairment model 138 may remove the daily spending limit on the credit card account at financial institution 130 that was previously applied at operation 330.

FIG. 4 illustrates a flow chart of an example method 400 for determining one or more first pre-impairment patterns for a primary account holder 105 and one or more second pre-impairment patterns for the non-primary account holder 110, in accordance with some aspects of the disclosure.

At 405, the computer system 135 may retrieve a first transaction history for the primary account holder 105 and a second transaction history for the non-primary account holder 110 from account database 140. The first and second transaction histories may include transaction details for each transaction completed by the primary account holder 105 and non-primary account holder 110. In one embodiment, transaction details may include the merchant's name and location, the transaction amount, and the transaction date. In other embodiments, transaction details may also include the name for each product or service purchased, the stock-keeping unit (SKU) code to identify products or services, the category designation for each product or service, and/or the sales price for each product or service.

At 410, the impairment model 138 may identify a date and/or time of the impairment event for the primary account holder 105. As mentioned earlier, the impairment model 138 may generate and store a record for each impairment event in an event log for the primary account holder 105. A record for each impairment event may include a date, timestamp, a predicted description of the event, and one or more of real-time location data, vital signs data, and acceleration data. Impairment model 138 may retrieve the date and/or time from the previously generated record for the impairment event.

At 415, the impairment model 138 may identify a subset of transactions in the first transaction history for the primary account holder 105 and a subset of transactions in the second transaction history for the non-primary account holder 110.

In some embodiments, the impairment model 138 may identify the subset of transactions in the first transaction history and the subset of transactions in the second transaction history by selecting transactions that occurred in a predefined period before the detected event causing impairment. The predefined period may include any time (e.g., four weeks, three months, one year, etc.) that may be established by the primary account holder 105 or impairment model 138.

At 420, the impairment model 138 may determine one or more first pre-impairment patterns for the primary account holder 105 based on the subset of transactions in the first transaction history that occurred before detection of the event causing impairment. One or more first pre-impairment patterns may include any routine or trend inferred based on the subset of transactions identified in the first transaction history at operation 415. In some embodiments, one or more first pre-impairment patterns may include one or more repeat merchants, the average transaction amount for each repeat merchant, the average transaction amount across all transactions, daily or weekly spending amounts, product preferences, and service preferences. For example, in the above scenario, the impairment model 138 may retrieve a subset of transactions from the first transaction history completed by the primary account holder 105 in a predefined period before the impairment event, which in this scenario is four weeks. Impairment model 138 may determine that one of the one or more first pre-impairment patterns may observe that the primary account holder 105 spends an average of $50 per day during those four weeks based on the identified subset of transactions.

At 425, the impairment model 138 may determine one or more second pre-impairment patterns for the non-primary account holder 110 based on the subset of transactions in the second transaction history that occurred before an impairment event. One or more second pre-impairment patterns may include any routine or trend inferred based on the subset of transactions identified in the second transaction history at operation 415. In some embodiments, one or more second pre-impairment patterns may include one or more repeat merchants, the average transaction amount for each repeat merchant, the average transaction amount across all transactions, daily or weekly spending amounts, product preferences, and service preferences. For example, in the above scenario, the impairment model 138 may retrieve a subset of transactions from the second transaction history completed by the non-primary account holder 110 in a four-week period before the detected event. In this scenario, the subset of transactions from the second transaction history may include twelve purchases at Dan's Diner. Based on the subset of transactions, impairment model 138 may identify Dan's Diner as one of several repeat merchants and that the average transaction amount spent by the non-primary account holder 110 at this merchant is $20.

At 430, the impairment model 138 may store the one or more first pre-impairment patterns in a first profile for the primary account holder 105 and the one or more second pre-impairment patterns in a second profile for the non-primary account holder 110 in account database 140.

FIG. 5 illustrates a flow chart of an example method 500 for deactivating one or more management controls on the one or more accounts associated with the primary account holder and non-primary account holder, in accordance with some aspects of the disclosure.

At 505, the impairment model 138 maintains the management controls for the one or more accounts associated with the primary account holder 105 and the non-primary account holder 110.

At 510, the impairment model 138 may determine if an active message indicating that the primary account holder 105 is no longer impaired has been received from user device 115. In one embodiment, an active message may include an interaction with an input control in a graphical user interface (e.g., buttons, toggles, etc.) of a mobile application. In another embodiment, an active message may include an email message or phone call to a customer service department. For example, in the above scenario, the primary account holder 105 may actively confirm that he is no longer impaired by navigating to the appropriate screen in a mobile application on user device 115 and clicking a button indicating that he is not impaired.

In some aspects, if the impairment model 138 receives an active message indicating that the primary account holder 105 is not impaired from user device 115, method 500 may include proceeding to operation 530. Operation 530 may include the impairment model 138 deactivating the management controls for the one or more accounts associated with the primary account holder 105 and the non-primary account holder 110. For example, in the above scenario, the impairment model 138 may remove the daily spending limit on the credit card account at financial institution 130 that was previously applied at operation 330 after receiving an active message from user device 115.

In some aspects, if the impairment model 138 does not receive an active message confirming that the primary account holder 105 is not impaired from user device 115, method 500 may include proceeding to operation 515.

At 515, the impairment model 138 may determine if a second vital signs data or a second location data indicating that the primary account holder 105 is no longer impaired has been received from user device 115. As mentioned earlier, the user device 115 may transmit real-time location data, vital signs data, or acceleration data to computer system 135 at predetermined time intervals (e.g., once thirty or sixty seconds). In another embodiment, the user device 115 may continuously transmit real-time location data, vital signs data, or acceleration data of the primary account holder 105 to computer system 135. In yet another embodiment, the user device 115 may send real-time location data, vital signs data, or acceleration data to computer system 135 in response to a query from computer system 135.

In some aspects, if the impairment model 138 may receive a second location data or vital signs data that suggests the primary account holder 105 is not impaired from user device 115, method 500 may include proceeding to operation 530. Operation 530 may include the impairment model 138 deactivating the management controls for the one or more accounts associated with the primary account holder 105 and the non-primary account holder 110. For example, in the above scenario, the impairment model 138 may receive a second location data from user device 115 upon the primary account holder 105 leaving the hospital after his one-week stay. Impairment model 138 may determine that the primary account holder 105 is no longer impaired if the second location from user device 115 falls outside a 0.5-mile radius of the hospital. Upon determining that the primary account holder 105 is not impaired, impairment model 138 may remove the daily spending limit on the credit card account at financial institution 130 that was previously applied at operation 330.

In some aspects, if the impairment model 138 does not receive a second location or vital signs data indicating that the primary account holder 105 is not impaired from user device 115, method 500 may include proceeding to operation 520.

At 520, the impairment model 138 may determine if one or more transactions conducted by the non-primary account holder 110 after detection of the impairment event match one of the second pre-impairment patterns. One or more post-impairment transactions by the non-primary account holder 110 that match one of the second pre-impairment patterns may suggest that the primary account holder 105 is no longer impaired because the non-primary account holder 110 has resumed at least one of their prior spending habits.

In some aspects, if the impairment model 138 determines that a transaction conducted by the non-primary account holder 110 after the detected event that matches one or more of their second pre-impairment patterns, method 500 may include proceeding to operation 530. As mentioned earlier, operation 530 may include the impairment model 138 deactivating the management controls for the one or more accounts associated with the primary account holder 105 and the non-primary account holder 110. For example, in the above scenario, one of the second pre-impairment patterns for the non-primary account holder 110 may include the designation of Dan's Diner as a repeat merchant. As mentioned earlier, the non-primary account holder 110 may purchase meals and beverages at a hospital café instead of Dan's Diner multiple times while the primary account holder 105 is in the hospital. If the non-primary account holder 110 later orders lunch at Dan's Diner, the impairment model 138 may compare the transaction to the one or more second pre-impairment patterns. Upon determining that the transaction matches one or more second pre-impairment patterns, the impairment model 138 may further conclude that the primary account holder 105 is no longer impaired and may remove the daily spending limit on the credit card account at financial institution 130 that was previously applied at operation 330.

In some aspects, if the impairment model 138 fails to identify a transaction conducted by the non-primary account holder 110 after the detected event that matches one of the one or more second pre-impairment patterns, method 500 may include proceeding to operation 525.

At 525, the impairment model 138 may determine if a waiting period has elapsed. In at least one embodiment, the waiting period may be any predefined period (e.g., thirty days) after the impairment model 138 has confirmed impairment status for the primary account holder 105. The waiting period may be established by the primary account holder 105 or impairment model 138. If the waiting period has elapsed, method 500 may include proceeding to operation 530. Again, operation 530 may include the impairment model 138 deactivating the management controls for one or more accounts associated with the primary account holder 105 and the non-primary account holder 110. If the waiting period has not elapsed, method 500 may include proceeding to operation 505.

Although FIGS. 3, 4, and 5 depict steps that are performed in a particular order for purposes of illustration and discussion, the methods of the present disclosure are not limited to the particularly illustrated order or arrangement. The various steps of methods 300, 400, and 500 can be omitted, rearranged, combined, or adapted in various ways without deviating from the scope of the present disclosure. Furthermore, methods 300, 400, and 500 can be performed by processing logic that can comprise hardware (e.g., circuitry, dedicated logic, programmable logic, microcode, etc.), software (e.g., instructions executing on a processing device), or a combination thereof.

Figure 6:
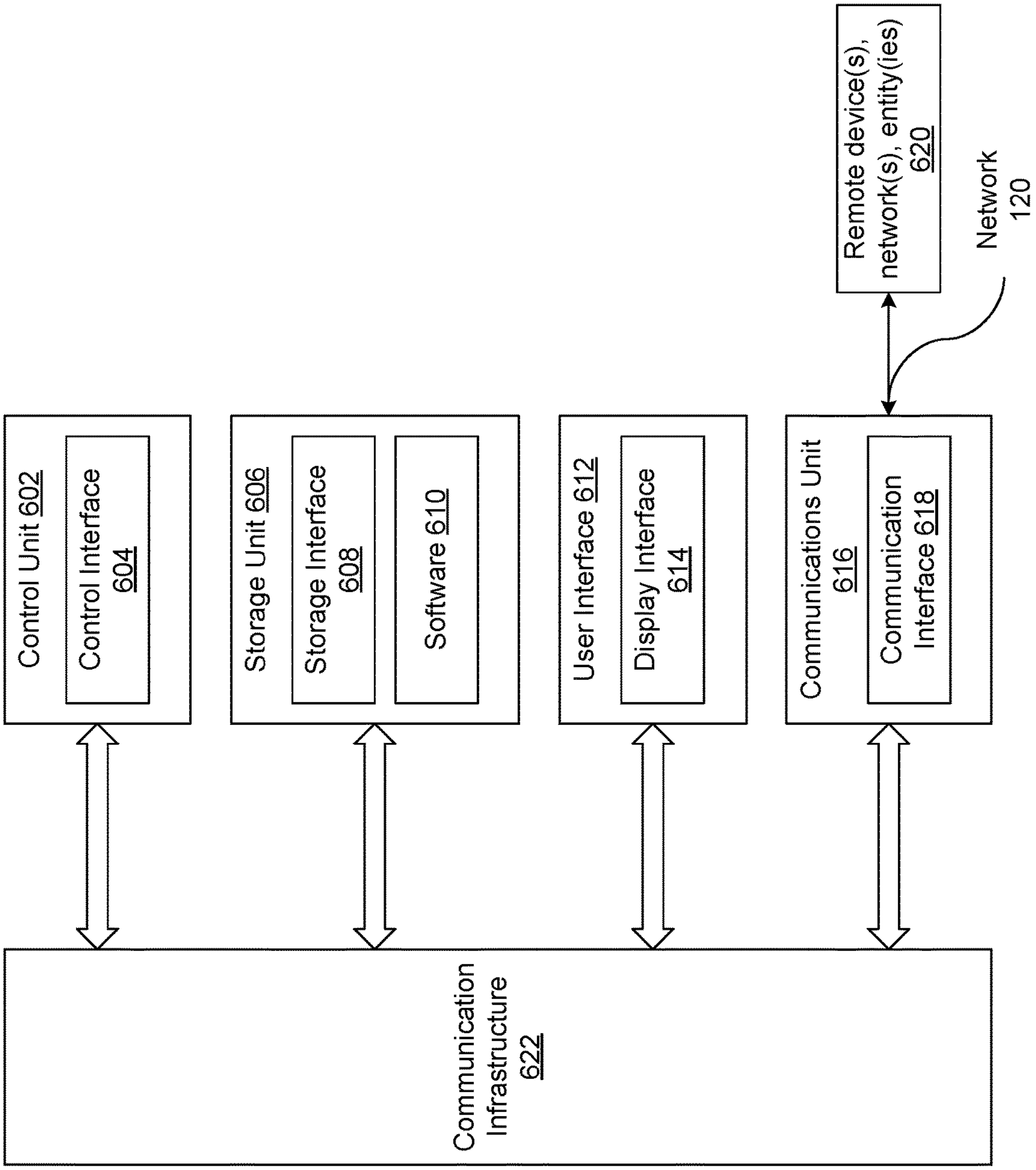
FIG. 6 illustrates an example computer system useful for implementing various embodiments.

FIG. 6 illustrates an example computer system useful for implementing various embodiments in FIGS. 1-5.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 500 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for protecting an account during a period of medical impairment, the computer-implemented method comprising:

storing, by a cloud server, one or more accounts associated with a primary account holder and a non-primary account holder in a database, wherein the non-primary account holder is a secondary user that can access and use the one or more accounts, and wherein the one or more accounts comprise a first transaction history for the primary account holder and a second transaction history for the non-primary account holder;

receiving, by the cloud server, at a predetermined time interval, a first data signal comprising real-time location data, vital signs data, and acceleration data of the primary account holder from a user device, the real-time location data generated by a geolocation monitoring device on the user device, the vital signs data generated by a vital sign monitoring device on the user device, and the acceleration data generated by an accelerometer on the user device;

determining, by the cloud server, an impairment status for the primary account holder by transmitting the real-time location data, the vital signs data, and the acceleration data to an impairment model having a predefined set of rules used to identify the impairment status;

confirming, by the cloud server, the impairment status for the primary account holder based on at least one transaction in the second transaction history for the non-primary account holder, wherein the at least one transaction occurred after determining the impairment status;

activating, by the cloud server and based on the confirming, management controls for the one or more accounts associated with the primary account holder and the non-primary account holder, wherein the management controls comprise disabling remote access via a web portal to the one or more accounts;

receiving, by the cloud server, a second data signal indicating the primary account holder is no longer impaired; and deactivating, by the cloud server and based on the receiving the second data signal, the management controls for the one or more accounts associated with the primary account holder and the non-primary account holder.

2. The computer-implemented method of claim 1, further comprising:

identifying, by the cloud server, an emergency contact for the primary account holder based on the impairment status for the primary account holder; and transmitting, by the cloud server, an alert to the emergency contact informing the emergency contact that the primary account holder experienced an impairment event and the non-primary account holder has access to the one or more accounts associated with the primary account holder and the non-primary account holder.

3. The computer-implemented method of claim 1, further comprising:

confirming, by the cloud server, the impairment status for the primary account holder based on data records from third-party sources, the data records comprising news reports, traffic reports, police reports, and hospital records.

4. The computer-implemented method of claim 1, wherein the activating the management controls for the one or more accounts associated with the primary account holder and the non-primary account holder further comprises:

deploying, by the cloud server, one or more of grace period extensions, credit limit increases, anti-fraud restrictions, and elevation of an emergency contact for the primary account holder to manager status of the one or more accounts associated with the primary account holder and the non-primary account holder.

5. The computer-implemented method of claim 1, further comprising:

determining, by the cloud server, a first pre-impairment pattern for the primary account holder based on transactions in the first transaction history for the primary account holder that occurred prior to an impairment event; and determining, by the cloud server, a second pre-impairment pattern for the non-primary account holder based on transactions in the second transaction history for the non-primary account holder that occurred prior to the impairment event.

6. The computer-implemented method of claim 5, wherein the receiving the second data signal indicating the primary account holder is no longer impaired comprises:

identifying, by the cloud server, second transactions in the second transaction history for the non-primary account holder that occurred after the impairment event; and determining, by the cloud server, the primary account holder is no longer impaired based on a comparison of the second pre-impairment pattern for the non-primary account holder and the second transactions in the second transaction history for the non-primary account holder that occurred after the impairment event.

7. The computer-implemented method of claim 1, wherein the receiving the second data signal indicating the primary account holder is no longer impaired comprises:

receiving, from the user device, second vital signs data or second location data of the primary account holder indicating the primary account holder is no longer impaired; or receiving, from the user device, an active message from the primary account holder confirming that the primary account holder is no longer impaired.

8. A system for protecting an account during a period of medical impairment, the system comprising:

a database for storing one or more accounts associated with a primary account holder and a non-primary account holder, wherein the one or more accounts comprise a first transaction history for the primary account holder and a second transaction history for the non-primary account holder, and wherein the non-primary account holder is a secondary user that can access and use the one or more accounts;

a memory for storing operations; and one or more processors configured to execute the operations, the operations comprising:

receiving, at a predetermined time interval, a first data signal comprising real-time location data, vital signs data, and acceleration data of the primary account holder from a user device, the real-time location data generated by a geolocation monitoring device on the user device, the vital signs data generated by a vital sign monitoring device on the user device, and the acceleration data generated by an accelerometer on the user device;

determining an impairment status for the primary account holder by transmitting the real-time location data, the vital signs data, and the acceleration data to an impairment model having a predefined set of rules used to identify the impairment status;

confirming the impairment status for the primary account holder based on at least one transaction in the second transaction history for the non-primary account holder, wherein the at least one transaction occurred after determining the impairment status;

activating, based on the confirming, management controls for the one or more accounts associated with the primary account holder and the non-primary account holder, wherein the management controls comprise disabling remote access via a web portal to the one or more accounts;

receiving a second data signal indicating the primary account holder is no longer impaired; and deactivating, based on the receiving the second data signal, the management controls for the one or more accounts associated with the primary account holder and the non-primary account holder.

9. The system of claim 8, the operations further comprising:

identifying an emergency contact for the primary account holder based on the impairment status for the primary account holder; and transmitting an alert to the emergency contact informing the emergency contact that the primary account holder experienced an impairment event and the non-primary account holder has access to the one or more accounts associated with the primary account holder and the non-primary account holder.

10. The system of claim 8, the operations further comprising:

confirming the impairment status for the primary account holder based on data records from third-party sources, the data records comprising news reports, traffic reports, police reports, and hospital records.

11. The system of claim 8, wherein the activating the management controls for the one or more accounts associated with the primary account holder and the non-primary account holder further comprises:

deploying one or more of grace period extensions, credit limit increases, anti-fraud restrictions, and elevation of an emergency contact for the primary account holder to manager status of the one or more accounts associated with the primary account holder and the non-primary account holder.

12. The system of claim 8, the operations further comprising:

determining a first pre-impairment pattern for the primary account holder based on transactions in the first transaction history for the primary account holder that occurred prior to an impairment event; and determining a second pre-impairment pattern for the non-primary account holder based on transactions in the second transaction history for the non-primary account holder that occurred prior to the impairment event.

13. The system of claim 12, wherein the receiving the second data signal indicating the primary account holder is no longer impaired comprises:

identifying second transactions in the second transaction history for the non-primary account holder that occurred after the impairment event; and determining the primary account holder is no longer impaired based on a comparison of the second pre-impairment pattern for the non-primary account holder and the second transactions in the second transaction history for the non-primary account holder that occurred after the impairment event.

14. The system of claim 8, wherein the receiving the second data signal indicating the primary account holder is no longer impaired comprises:

receiving, from the user device, second vital signs data or second location data of the primary account holder indicating the primary account holder is no longer impaired; or receiving, from the user device, an active message from the primary account holder confirming that the primary account holder is no longer impaired.

15. A non-transitory computer readable medium having instructions stored there on, that when executed by at least one computing device, cause the at least one computing device to perform operations for protecting an account during a period of medical impairment comprising:

storing one or more accounts associated with a primary account holder and a non-primary account holder in a database, wherein the non-primary account holder is a secondary user that can access and user the one or more accounts, and wherein the one or more accounts comprise a first transaction history for the primary account holder and a second transaction history for the non-primary account holder;

receiving, at a predetermined time interval, a first data signal comprising real-time location data, vital signs data, and acceleration data of the primary account holder from a user device, the real-time location data generated by a geolocation monitoring device on the user device, the vital signs data generated by a vital sign monitoring device on the user device, and the acceleration data generated by an accelerometer on the user device;

determining an impairment status for the primary account holder by transmitting the real-time location data, the vital signs data, and the acceleration data to an impairment model having a predefined set of rules used to identify the impairment status;

confirming the impairment status for the primary account holder based on at least one transaction in the second transaction history for the non-primary account holder, wherein the at least one transaction occurred after determining the impairment status;

activating, based on the confirming, management controls for the one or more accounts associated with the primary account holder and the non-primary account holder, wherein the management controls comprise disabling remote access via a web portal to the one or more accounts;

receiving a second data signal indicating the primary account holder is no longer impaired; and deactivating, based on the receiving the second data signal, the management controls for the one or more accounts associated with the primary account holder and the non-primary account holder.

16. The non-transitory computer readable medium of claim 15, the operations further comprising:

identifying an emergency contact for the primary account holder based on the impairment status for the primary account holder; and transmitting an alert to the emergency contact informing the emergency contact that the primary account holder experienced an impairment event and the non-primary account holder has access to the one or more accounts associated with the primary account holder and the non-primary account holder.

17. The non-transitory computer readable medium of claim 15, the operations further comprising:

confirming the impairment status for the primary account holder based on data records from third-party sources, the data records comprising news reports, traffic reports, police reports, and hospital records.

18. The non-transitory computer readable medium of claim 15, wherein the activating the management controls for the one or more accounts associated with the primary account holder and the non-primary account holder further comprises:

deploying one or more of grace period extensions, credit limit increases, anti-fraud restrictions, and elevation of an emergency contact for the primary account holder to manager status of the one or more accounts associated with the primary account holder and the non-primary account holder.

19. The non-transitory computer readable medium of claim 15, wherein the receiving the second data signal indicating the primary account holder is no longer impaired comprises:

determining a pre-impairment pattern for the non-primary account holder based on transactions in the second transaction history for the non-primary account holder that occurred prior to an impairment event; and determining the primary account holder is no longer impaired based on a comparison of the pre-impairment pattern for the non-primary account holder and transactions in the second transaction history for the non-primary account holder that occurred after the impairment event.

20. The non-transitory computer readable medium of claim 15, wherein the receiving the second data signal indicating the primary account holder is no longer impaired comprises:

receiving, from the user device, second vital signs data or second location data of the primary account holder indicating the primary account holder is no longer impaired; or receiving, from the user device, an active message from the primary account holder confirming that the primary account holder is no longer impaired.

* * * * *